(12) United States Patent
Edvardsson (10) Patent No.: US 8,854,253 B2
(45) Date of Patent: Oct. 7, 2014

(54) RADAR LEVEL GAUGING WITH DETECTION OF MOVING SURFACE

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 580 days.

(21) Appl. No.: 13/246,261

(22) Filed: Sep. 27, 2011

(65) Prior Publication Data

US 2013/0076559 A1    Mar. 28, 2013

(51) Int. Cl.
| | | |
|---|---|---|
| G01S 13/08 | (2006.01) | |
| G01F 23/284 | (2006.01) | |
| G01S 13/36 | (2006.01) | |

(52) U.S. Cl.
CPC .............. G01S 13/36 (2013.01); G01F 23/284 (2013.01)
USPC .............................. 342/124; 342/118; 342/127

(58) Field of Classification Search
USPC ........................... 342/118, 120, 124, 127–144
See application file for complete search history.

(56) References Cited

U.S. PATENT DOCUMENTS

| | | | | |
|---|---|---|---|---|
| 3,216,010 | A | | 11/1965 | Roeschke ........................ 343/12 |
| 3,623,097 | A | | 11/1971 | Femenias |
| 3,725,924 | A | | 4/1973 | Easton |
| 4,044,353 | A | * | 8/1977 | Levy .............................. 342/124 |
| 4,293,934 | A | | 10/1981 | Herolz et al. |
| 4,661,817 | A | | 4/1987 | Bekkadal et al. |
| 4,914,441 | A | | 4/1990 | Brookner |
| 5,130,714 | A | | 7/1992 | Taylor |
| 5,406,842 | A | * | 4/1995 | Locke ........................... 73/290 R |
| 5,440,310 | A | | 8/1995 | Schreiner ...................... 342/124 |
| 5,504,490 | A | | 4/1996 | Brendle et al. |
| 5,546,088 | A | | 8/1996 | Trummer et al. .............. 342/124 |
| 5,689,265 | A | * | 11/1997 | Otto et al. ...................... 342/124 |
| 6,107,957 | A | * | 8/2000 | Cramer et al. ................. 342/124 |
| 6,137,438 | A | * | 10/2000 | McEwan ........................ 342/134 |
| 6,415,660 | B1 | * | 7/2002 | Sinz et al. ................... 73/290 R |
| 6,642,884 | B2 | | 11/2003 | Bryant et al. |
| 6,680,690 | B1 | * | 1/2004 | Nilsson et al. ................ 342/124 |

(Continued)

FOREIGN PATENT DOCUMENTS

| | | |
|---|---|---|
| DE | 10 2005 057 094 A1 | 6/2007 |
| EP | 1 069 438 A1 | 1/2001 |

(Continued)

OTHER PUBLICATIONS

International Search Report for PCT Application No. PCT/EP2011/066896, dated Jun. 5, 2012, 4 pages.

(Continued)

*Primary Examiner* — Peter Bythrow
(74) *Attorney, Agent, or Firm* — Westman, Champlin & Koehler, P.A.

(57) ABSTRACT

A radar level gauging principle including transmitting at least two time separated carrier wave pulses having equal carrier frequencies, determining a change in phase shift associated with two pulses in the transmit signals having equal frequencies, comparing the change with a threshold value, and depending on a result of the comparing step, determining the distance based on a relationship between the transmit signals and the return signals.

By comparing the actual phase resulting from two substantially identical pulses transmitted a certain time apart, an indication of a change of filling level can be obtained. This indication can then be used to initiate a full measurement cycle.

19 Claims, 5 Drawing Sheets

(56) References Cited

U.S. PATENT DOCUMENTS

| | | | |
|---|---|---|---|
| 7,079,029 B2* | 7/2006 | Tsuji | 340/552 |
| 7,230,980 B2 | 6/2007 | Langford et al. | |
| 7,482,818 B2 | 1/2009 | Greenwald et al. | |
| 8,044,844 B2* | 10/2011 | Nyberg | 342/124 |
| 2002/0020216 A1* | 2/2002 | Schultheiss | 73/290 V |
| 2006/0012512 A1* | 1/2006 | Jirskog | 342/124 |
| 2007/0109177 A1* | 5/2007 | Baath et al. | 342/124 |
| 2007/0186678 A1* | 8/2007 | Griessbaum et al. | 73/861 |
| 2008/0105048 A1* | 5/2008 | Nilsson et al. | 73/290 V |
| 2008/0143583 A1 | 6/2008 | Welle et al. | |
| 2009/0051581 A1* | 2/2009 | Hatono | 342/33 |
| 2010/0067570 A1 | 3/2010 | Lipp | |
| 2010/0175470 A1* | 7/2010 | Schrier et al. | 73/290 V |
| 2010/0265121 A1* | 10/2010 | Bandhauer et al. | 342/135 |
| 2011/0140951 A1* | 6/2011 | Nyberg | 342/124 |
| 2011/0161019 A1 | 6/2011 | Mayer | |
| 2011/0187583 A1* | 8/2011 | Nouvel et al. | 342/129 |
| 2012/0169528 A1 | 7/2012 | Edvardsson et al. | |
| 2013/0076560 A1 | 3/2013 | Edvardsson et al. | |

FOREIGN PATENT DOCUMENTS

| | | |
|---|---|---|
| EP | 2166671 A2 | 3/2010 |
| GB | 2123237 | 6/1982 |
| JP | 2004301617 | 10/2004 |
| WO | WO 00/73747 A1 | 12/2000 |
| WO | WO01/46653 | 6/2001 |

OTHER PUBLICATIONS

Written Opinion for International Search Report for PCT Application No. PCT/EP2011/066896, dated Jun. 5, 2012, 9 pages.

Stuchly et al., "Microwave Surface Level Monitor", IEEE Transactions on Industrial Electronics and Control Instrumentation, vol. IECI-18, No. 3, Aug. 1971, 8 pages.

Merrill Skolnik, "Introduction to Radar Systems, passage", Introduction to Radar Systems (Second Edition), McGraw Hill, SG, pp. 88-91, XP002548186, Jan. 1, 1980, ISBN: 978-0-07-057909-5, 4 pages.

Saunders, W.K., "Post-War Developments in Continuous-Wave and Frequency-Modulated Radar", IRE Transactions on Aeronautical and Navigational Electronics, IEEE, USA, vol. ANE-2, No. 1, Mar. 1, 1961, pp. 7-19, XP011245965, ISSN: 0096-1639, 14 pages.

International Search Report for PCT Application No. PCT/EP2011/066875, dated Jun. 1, 2012, 4 pages.

Written Opinion for International Search Report for PCT Application No. PCT/EP2011/066875, dated Jun. 1, 2012, 10 pages.

International Search Report for PCT Application No. PCT/EP2011/074207, dated Apr. 2, 2012, 4 pages.

Written Opinion for International Search Report for PCT Application No. PCT/EP2011/074207, dated Apr. 2, 2012, 8 pages.

"Microwave Surface Level Monitor"; Stuchly et al., IEEE Transactions on Industrial Electronics and Control Instrumentation, vol. IECI-18, No. 3, Aug. 1971, pp. 85-92, 8 total pages.

* cited by examiner

RADAR LEVEL GAUGING WITH DETECTION OF MOVING SURFACE

FIELD OF THE INVENTION

The present invention relates to a radar level gauge using electromagnetic waves to determine a distance to a surface of a product in a tank.

BACKGROUND OF THE INVENTION

Since the radar level gauging was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 25-27 GHz, or 9.5-11 GHz. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. Due to the linear sweep, this difference frequency, also referred to as an intermediate frequency (IF), is proportional to the distance to the reflecting surface. The mixer signal is often referred to as an IF signal.

Although highly accurate, classic FMCW systems are relatively power hungry, making them less suitable for applications where power is limited. Examples of such applications include field devices powered by a two-wire interface, such as a 4-20 mA loop, and wireless devices powered by an internal power source (e.g. a battery or a solar cell).

In U.S. Ser. No. 12/981,995, by the same inventor, a novel and less power hungry measuring principle was introduced, involving emitting a series of pulses having constant carrier wave frequency, each pulse being long compared to the time of transit (e.g. a pulse duration in the order of 1 us to 100 ms, compared to time of transit in the order of tenths of a µs). The method is therefore referred to as a Multiple Frequency Pulsed Wave (MFPW).

The number of different carrier wave frequencies in a measurement cycle is insufficient to provide a continuous IF signal, or even an approximation of the IF frequency in the way done in so called "stepped" or "discrete" FMCW system where the steps are monotonous without power breaks to form a continuous signal. Instead, the small set of frequencies is chosen according to a specified frequency scheme, and a phase shift in the received pulse is determined for each frequency.

Figure 1:
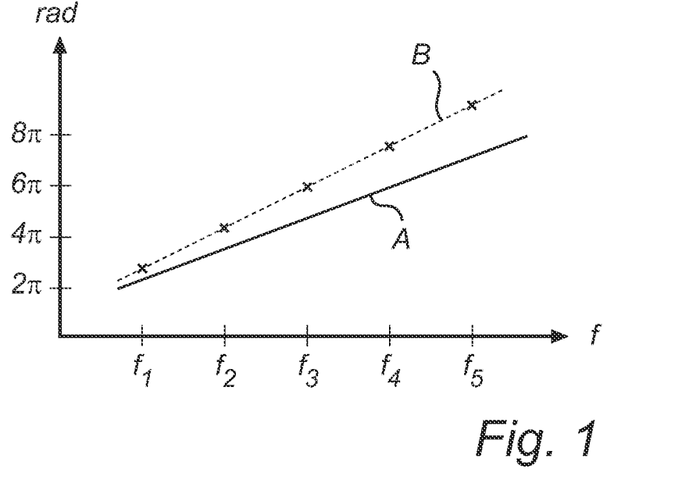
FIG. 1 is a diagram showing phase versus transmitted frequencies.

The process of determining the distance to the surface involves establishing a change of phase with emitted frequency (see FIG. 1). The line A represents an initial distance estimation, while line B represents an updated estimation. In theory, only two values (points x) are required to determine the rate of change (slope of line B), while in practice a larger number, e.g. a few hundred samples, may be required. Such a group of samples can be called measurement cycle and is a substitute for a FMCW-sweep. During a start up process (when no approximate distance is known) more samples are needed and this is also the case in more complicated cases (turbulence, disturbing echoes etc). As a start-up procedure samples like a rather conventional FMCW-sweep can be used.

In order to even further reduce power consumption it is desirable to only perform a complete distance measurement when required, i.e. when the surface has moved since the previous measurement.

GENERAL DISCLOSURE OF THE INVENTION

It is an object of the present invention to provide an improved radar level gauging system of the kind using pulses of constant frequency which are long compared to the time of transit, which system is capable to detect a movement of the surface without performing a complete measurement cycle.

This and other objects are achieved with a method for determining a distance to a surface of a product kept in a tank, the method comprising the steps of transmitting electromagnetic transmit signals towards the surface, receiving electromagnetic return signals reflected at the surface, the transmit signals comprising at least one pair of time separated, distinct carrier wave pulses having equal frequency, each pulse having a duration greater than 1 microsecond and shorter than 100 milliseconds, determining actual phase properties of each distinct pulse received in relation to each corresponding distinct pulse transmitted, determining a change in actual phase between the two pulses, comparing the change with a threshold value, and depending on a result of the comparing step, determining the distance based on a relationship between the transmit signals and the return signals.

The object is also achieved by a level gauging system for detecting a distance to a surface of a product in a tank, the system comprising a transceiver for transmitting electromagnetic transmit signals and receiving electromagnetic return signals reflected at the surface, the transceiver being arranged to transmit signals comprising at least one pair of time separated, distinct carrier wave pulses having equal frequency, each pulse having a duration greater than 1 microsecond and shorter than 100 milliseconds, processing circuitry configured to determine actual phase properties of each distinct pulse received in relation to each corresponding distinct pulse transmitted, determine a change in phase shift between the two pulses, compare the change with a threshold value, and depending on a result of the comparing step, determine the distance based on a relationship between the transmit signals and the return signals.

By comparing the actual phase resulting from two substantially identical pulses transmitted a certain time apart, an indication of a change of filling level can be obtained. This indication can then be used to initiate a full measurement cycle.

By "equal frequencies" is intended frequencies which are so similar that the phase shifts of these frequencies can be compared and used as an indication of a moving surface. As an example, the deviation between two equal carrier frequencies can be less than 1/1000. Such accuracy may be provided by a fed-back control loop, such as a phase locked loop (PLL).

For a gauge operating in the 25 GHz area, a 1 mm level change will change the phase approximately 60 degrees. For a gauge operating in the 10 GHz area, the corresponding phase change is about 24 degrees. A phase difference of 15-20 degrees can be described as a −10 dB change, and can be reliably detected. So, for these two operating frequencies a sensitivity can be estimated at about 0.3 mm and 0.8 mm respectively. A typical tank pumping (filling or emptying) can be one or a few cm per minute, so during a time period of 10 s the level change will be several mm, and thus be reliably detectable.

According to one embodiment, a complete transmit signal, containing sufficient information for a distance detection, is always transmitted, but the distance detecting processing is only performed if a sufficiently large change in phase between associated with pulses having equal frequencies is detected.

According to another embodiment, the level gauge is operated in a first mode and a second mode, wherein the distance is determined in the first operating mode, and the phase shift change is determined in the second operating mode. The first operating mode is selected depending on a result of the comparing step.

In the second operating mode, the level gauge can then monitor the surface, and the first operating mode is only selected when a movement is detected.

Preferably, an average transmitted power is lower in the second operating mode than in the first operating mode. Less power is then consumed during monitoring of the surface, while more power is used to determine the filling level when a moving surface is detected.

In the second mode, the transmit signals may include a plurality of time separated groups of pulses each including at least two pulses having different frequency, at least one pulse in each group of pulses having an equal frequency as a pulse in a preceding group of pulses. A plurality of phase shift changes relating to different pairs of pulses having equal frequency can then be determined.

According to this embodiment, the determination of whether the level is moving or not may thus be based on several pairs of identical pulses, which can make the determination more reliable.

According to a further embodiment, at least one of the pulses in each group of pulses has a frequency which was not included in a preceding group. In other words, one or several frequencies in the group of pulses may be replaced from one group to another, while one or several frequencies remain unchanged. Thereby, a phase shift change may be determined after each group of pulses, but for different frequencies.

The complete distance measurement can be performed according to any principle, including MFPW, FMCW, stepped FMCW, pulsed TDR, etc.

The frequency scheme in an MFPW-type system may be adapted so that the pulse train includes pulses with equal frequencies which are separated in time by a defined period.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

In the present description, embodiments of the present invention are mainly described with reference to a radar level gauge system having a free propagating antenna for radiating and capturing electromagnetic signals. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides, such as a still pipe, a transmission line or a probe, such as a single-line probe (including a so-called Goubau probe), a twin-line probe or a coaxial probe.

Figure 2:
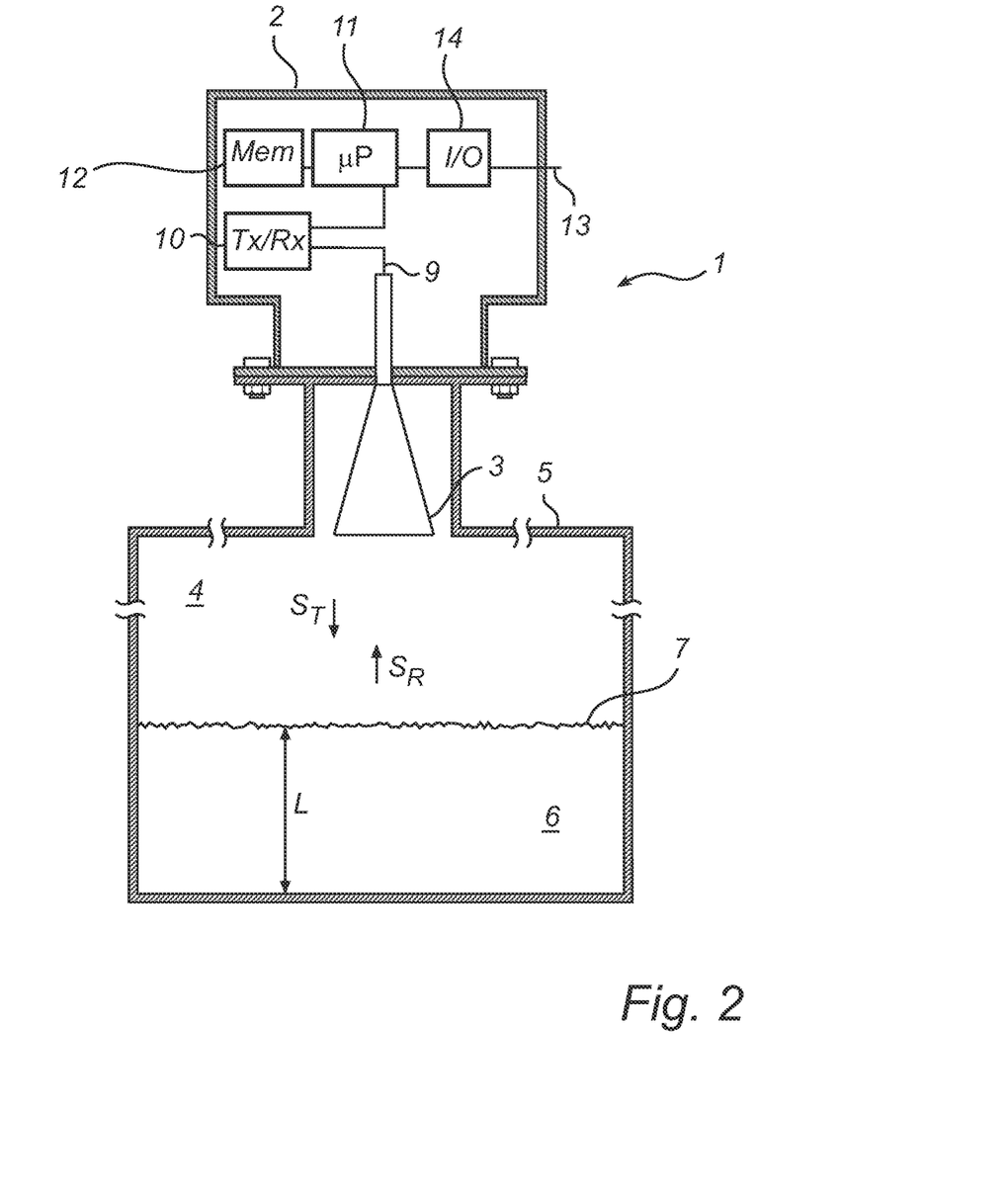
FIG. 2 is a schematic block diagram of a radar level gauge mounted on a tank.

Further, the operating principle of the level gauge described below is MFPW, as disclosed in U.S. application Ser. No. 12/981,995. However, it is realized that the operating principle for performing the level detection may be any kind, including FMCW and pulsed level gauging using time domain reflectometry. As the skilled person will recognize, FMCW involves transmitting a frequency sweep over a range of frequencies, and determining the distance based on a relationship between the transmitted sweep and the reflected sweep. Pulsed level gauging involves transmitting a train of short pulses, and determining the distance based on the time of flight for each pulse. FIG. 2 schematically illustrates a radar level gauge system 1 according to an embodiment of the present invention, comprising a measurement electronics unit 2, and a signal propagating device, here a horn antenna 3. The radar level gauge system 1 is provided on a tank 5, which is partly filled with a product 6 to be gauged. In the case illustrated in FIG. 1, the product 6 is a solid, such as grain or plastic pellets, which is well-known to represent a difficult application requiring a relatively high measurement sensitivity of the radar level gauge system. By analyzing transmitted signals $S_T$ being radiated by the antenna 3 towards the surface 7 of the product 6, and echo signals $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner.

As is schematically illustrated in FIG. 2, the electronics unit 2 comprises a transceiver 10 for transmitting and receiving electromagnetic signals, which is connected to the antenna 3 via a wave guide 9. The unit 2 further comprises a processing circuitry 11, which is connected to the transceiver 10 for control of the transceiver and processing of signals received by the transceiver to determine the filling level of the product 6 in the tank 5. The processing circuitry 11 is also connected to a memory 12, storing any software required for the operation of the gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. The current in the lines is regulated in accordance with a measurement result determined by the processing circuitry 11.

Alternatively, the gauge may communicate wirelessly with the control station using e.g. a Wireless HART protocol, and use a local power supply with batteries or other means of scavenging energy for autonomous operation.

Although being shown as separate blocks in FIG. 2, several of the transceiver 10, the processing circuitry 11 and the interface 12 may be provided on the same circuit board.

Figure 3:
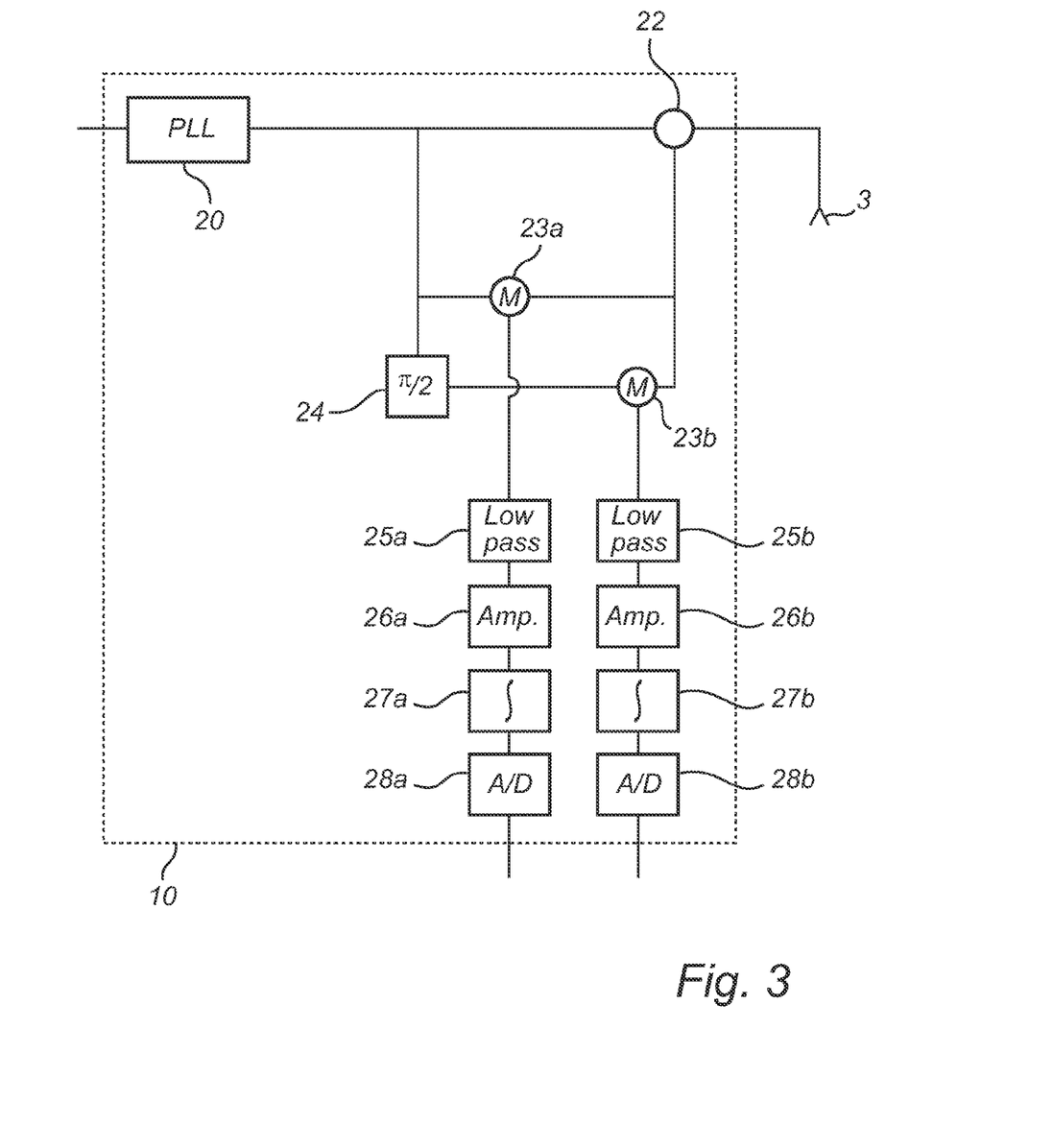
FIG. 3 is a more detailed block diagram of the transceiver in FIG. 1, according to a first embodiment of the present invention.

FIG. 3 schematically shows an exemplary transceiver 10 suitable for implementing an embodiment of the present invention.

A signal generator 20 is arranged to generate carrier wave pulses with a well defined and accurately controlled carrier frequency. The accuracy deviation should be less than 1/1000, and preferably less than 1/10000 or better. This may be achieved with a feed back control system, and the signal generator may for example be a phase locked loop, PLL.

In the illustrated example discussed herein, the pulse duration will be assumed to be about 2 ms, but significantly shorter pulses, e.g. in the order of has are also possible. It should be noted that in a tank gauging context, pulses of a duration in the order µs or ms, as mentioned here, are much too long to enable pulsed distance measurement with time domain reflectometry, i.e. to receive a reflected pulse and determine its time of flight. The pulses according to the present invention are thus longer than pulses in conventional pulsed radar level gauges, where a typical pulse duration is in the order of ns.

The average power of the pulses can be in the nW or µW area. However, the duty cycle, i.e. the relationship between the pulses and the intervals there between, should be limited to less than 50%, and is preferably significantly lower, e.g. 5% or even 1% or less. For a 1% duty cycle an average power in the range 1-50 µW may be reasonable. Compared to conventional FMCW, this means that the pulses may be emitted with a relatively high power, without increasing the average power of the measurement cycle.

The pulses are typically radar pulses, with a carrier wave frequency in the GHz area. The frequency range may be in the order of 10% of the operating frequency, and may be e.g. between 25 and 27 GHz, or between 9.5 and 11 GHz. The number of frequencies N may preferably be determined based on the conditions prevalent in the tank. The duration of the pulses, the duty cycle, and the frequency of the PLL are controlled by the processor 11 (see FIG. 2).

The transmit signal generated by the signal generator 20 will include pulses having equal carrier frequency, separated by a predetermined time period. These equal carrier frequencies may be selected from a predefined set of frequencies, and the identical pulses may be included in a serried of pulses having different carrier frequencies. Alternatively, there are no pulses transmitted in between the identical pulses.

A circulator, or a power divider such as a Wilkinson Power Divider (WPD) 22, is provided to direct the signal from the signal generator 20 to the antenna 3 in the tank 5 and to direct reflected signals from the antenna 3 to a receiver section of the transceiver 10.

The receiver section comprises two channels, an in-phase channel (I) and a quadrature channel (Q), each comprising a mixer 23a, 23b for homodyne mixing of the received signal. The first mixer 23a is provided with the transmitted pulses directly from the PLL 20 (I-channel). The second mixer 23b is provided with the transmitted pulses from the PLL 20 via a 90 degrees phase shifter 24 (Q-channel).

Each channel comprises a low pass filter 25a, 25b and an amplifier 26a, 26b. The filters and amplifiers improve the signal-to-noise ratio of the radar level gauge system.

The low pass filters 25a, 25b preferably have a bandwidth corresponding to the inverse of the pulse width. In other words, if the duration of the pulse is 2 ms, a suitable filter will be 500 Hz wide. Longer pulses can thus be used to increase the sensitivity (smaller bandwidth) at the expense of the average power or the update rate. However, if a low duty cycle is desired, in order to achieve a low average power consumption, the pulses should be kept reasonable short, and the bandwidth of the low pass filters 25a, 25b must then be wider (with less sensitivity) than a conventional FMCW.

The signals are then supplied to two integrators 27a, 27b, for integrating the signals over the length of the pulse. Finally two ND-converters 28a, 28b are arranged to A/D convert the integrated value, and the digital output is supplied to the processor 11 for storage and processing.

The PLL 20 may optionally be connected to a modulator (not shown), arranged to frequency modulate the pulses from the PLL 20. Such modulation is described in more detail in U.S. application Ser. No. 12/981,995, herewith incorporated by reference. With such modulation, a distance dependence is introduced, which might be advantageous for distance determination.

It should be noted that the topology of the transceiver illustrated in FIG. 3, with two parallel receiver channels (I and Q), is not to be viewed as limiting to the concept.

For example, a sequential approach may be used for the RF mixing by mixers 23a, 23b, i.e. to alternatingly provide I- and Q-phase values. Such an approach may reduce the number of components at the cost of increasing the number of pulses per measurement.

Figure 4:
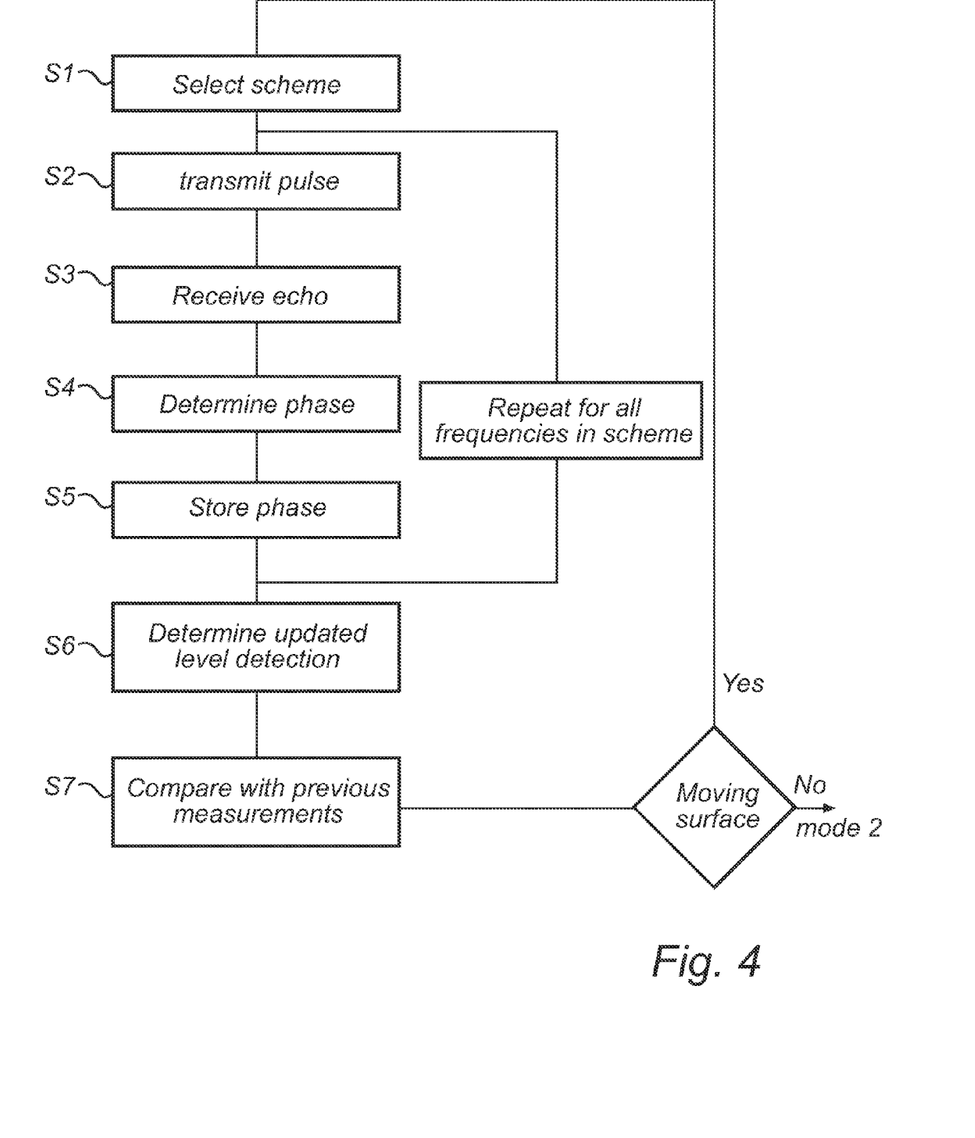
FIG. 4 is a flow chart of a first operating mode of the gauge in FIG. 2.
Figure 5:
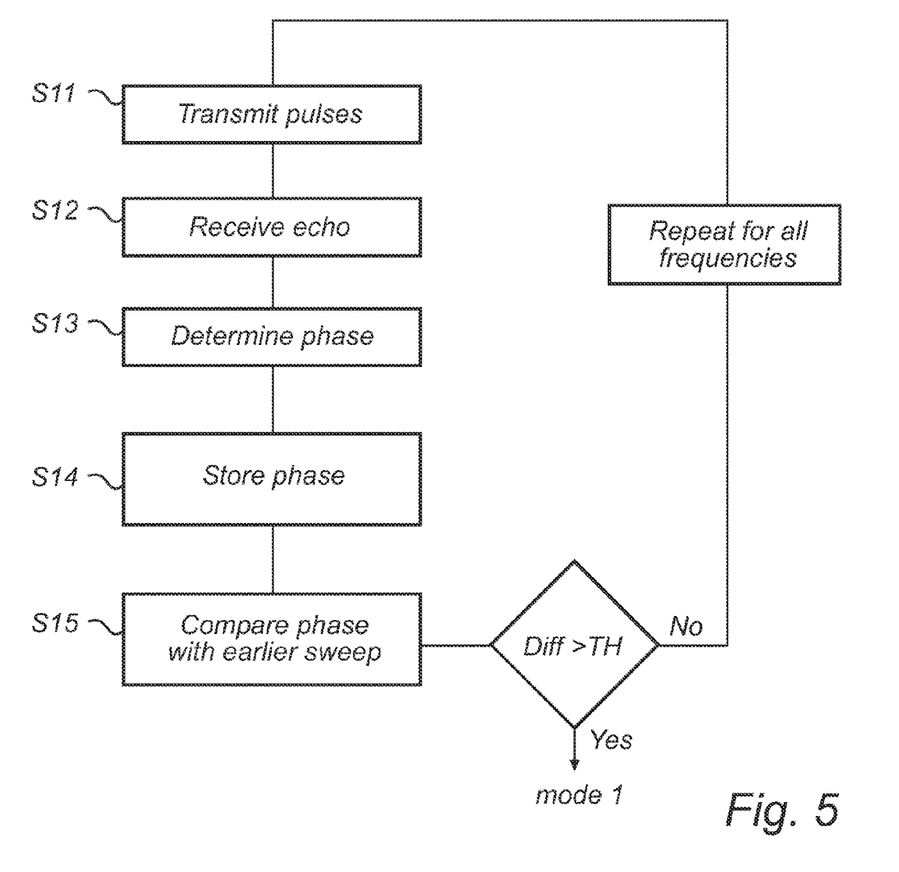
FIG. 5 is a flow chart of a second operating mode of the gauge in FIG. 2.

The operation of the radar level gauge illustrated in FIGS. 2 and 3, will be further described with reference to FIGS. 4 and 5, showing schematic flow charts of two different modes of operation. FIG. 4 shows a procedure as outlined in U.S. application Ser. No. 12/981,995, herewith incorporated by reference, which is suitable for tracking a moving surface level, i.e. during filling or emptying of the tank. FIG. 5 shows a procedure suitable for monitoring a stable, unchanging surface level, i.e. during a period when the content in the tank is not being emptied or filled.

With reference to FIG. 4, in step S1, a frequency scheme is determined according to a predefined procedure. Under advantageous measuring conditions (non turbulent), the scheme may include in the order of 10 frequencies. Under more difficult conditions, it may be necessary to include several hundred frequencies. The frequency range may be in the order of 10% of the operating frequency, and may be e.g. between 25 and 27 GHz, or between 9.5 and 11 GHz.

Then, in step S2-S4, a measurement cycle is performed with the selected frequencies in the selected order. For each frequency, a pulse of a determined duration, e.g. 2 ms, is generated by the PLL 20 and transmitted as signals ST into the tank by the antenna 3 (step S2).

The transmitted electromagnetic signals ST are reflected at impedance transitions in the tank 5, including the surface 7 of the product 6 contained in the tank 5, and are returned to the transceiver 10 as echo signals SR by the antenna 3. The reflected signal SR is received (step S3) by the two channels (I and Q) in the receiver side of the transceiver 10.

Then, in step S4, a phase difference between the transmitted pulse and the reflected pulse is determined by the processor 11 using the output from the two channels and conventional I/Q processing. Each phase shift is recorded in memory 13 (step S5), and steps S2-S5 are repeated for all frequencies in the scheme.

In step S6, the processor 11 correlates each phase difference value (which is in the range 0-2π) to an expected phase difference value, calculated based on a previously detected distance. The difference between the expected phase and the actual, detected phase corresponds to a distance offset. In principle, one such offset, resulting from a single frequency, is sufficient to provide an updated distance detection. However, the uncertainty in such a detection will normally be too significant to provide satisfactory reliability, and some kind of statistical analysis will normally be required.

In step S7 the processor 11 compares the obtained distance measure with previously obtained measurements. In a situation where the distance has not changed during these measurements, it is determined that the surface is steady and not moving. The criteria for such a determination may of course vary depending on the application, but for example, 10 distance measurements obtained during a period of e.g. 1 minute may be compared with each other. If all these values equal are within a given error margin, it can be determined that the level is stable. When such a determination is made, the processor 11 and transceiver 10 shift to the second operating mode, as will be described below. If not, the processing returns to step S1, for a new cycle. Note that the frequency scheme may be updated between cycles, depending on the results of the measurement.

With reference to FIG. 5, the second operating mode will be described.

First, in step S11 a pulse of a determined duration, e.g. 2 ms, is generated by the PLL 20 and transmitted as signals ST into the tank by the antenna 3.

In step S12, the transmitted electromagnetic signals ST are reflected at impedance transitions in the tank 5, including the surface 7 of the product 6 contained in the tank 5, and are returned to the transceiver 10 as echo signals SR by the antenna 3. The return signal SR is received by the two channels (I and Q) in the receiver side of the transceiver 10.

Then, in step S13, a phase difference between the transmitted pulse and the reflected pulse is determined by the processor 11 using the output from the two channels and conventional I/Q processing. The phase shift is recorded in memory 13 (step S14), and in step S15, the detected phase shift is compared with a previously stored phase shift for a pulse of equal frequency from an earlier sweep. As an example, the time separation between pulses having equal carrier frequencies may be at least five or at least ten seconds. The change in phase shift associated with these pulses is compared to a threshold value (TH), selected based on the specific implementation.

If the phase shift change is greater than the threshold value, this indicates that the surface has moved since the earlier sweep, and the processor 11 and transceiver 10 shifts to the first operating mode, described above, in order to track the surface level. If the change in phase is smaller than the threshold value it is determined that the level is still steady (unmoving) and processing returns to step S11. Steps S11-S15 are repeated continuously for a selected number of frequencies. The number of frequencies is typically lower than what is required to perform a complete measurement, and may in the extreme case be only one (the transmit signal is then simply a train of identical pulses). However, it may be advantageous to use at least two or even more frequencies in the second operating mode. This can make the process less sensitive for disturbances and more reliable. The pulses may then be transmitted in groups, each group of pulses including a set of frequencies, and consecutive sweeps having at least one frequency in common, to enable comparison.

Also note that the frequencies included in each group may be different. According to one embodiment, each group includes a plurality of frequencies, e.g. two frequencies, and at least one of these frequencies is replaced in every other group. So, for example, a first group may include frequencies A and B, a second group frequencies B and C, a third group frequencies C and D, and a fourth group frequencies D and A. This way a comparison of equal frequency pulses can be made for each group, but always for a different frequency.

The determination that the surface is moving may preferably be based on repeated comparisons, in order to avoid an unintentional disturbance, such as a drop from the antenna, resulting in an unnecessary level detection. For example, it may be advantageous to compare more than two consecutive phase shifts for pulses having equal frequencies. If the phase shift first changes, but then returns to the previous value, then a disturbance may be assumed. If, on the other hand, two or more comparisons confirm the changed phase shift, then an actual movement of the surface has probably taken place. Various other statistical treatments can be envisaged by the skilled person.

The person skilled in the art realizes that the present invention by no means is limited to the preferred embodiments described above. On the contrary, many modifications and variations are possible within the scope of the appended claims. For example, the principles of the present invention do not require I/Q processing, but are in fact applicable also to a single channel system. Further, the details of the transceiver circuitry may be modified in a number of ways, without departing from the inventive concept. Also, in the gauge may operate in further operating modes, in addition to the first and second operating modes.

What is claimed is:

1. A method of determining a distance to a surface of a product kept in a tank, said method comprising the steps of:
    transmitting electromagnetic transmit signals towards said surface,
    receiving electromagnetic return signals reflected at said surface,
    said transmit signals comprising at least two time separated carrier wave pulses having equal carrier frequencies, each pulse having a duration greater than 1 microsecond and shorter than 100 milliseconds,
    determining actual phase properties of each pulse in the transmit signals in relation to each corresponding pulse in the return signals, said phase properties including a phase shift,
    determining a change in phase shift associated with two pulses in the transmit signals having equal frequencies,
    comparing said change with a threshold value, and
    depending on a result of said comparing step, determining said distance based on a relationship between said transmit signals and said return signals.

2. The method according to claim 1, said method comprising operating in a first operating mode and a second operating mode, wherein said distance is determined in said first operating mode, wherein said phase shift change is determined in said second mode, and wherein said first operating mode is selected depending on a result of said comparing step.

3. The method according to claim 2, wherein an average transmitted power is lower in said second operating mode than in said first operating mode.

4. The method according to claim 2, said method comprising
    transmitting, in said second operating mode, a plurality of time separated groups of pulses each including at least two pulses having different frequency, at least one pulse in each group of pulses having an equal frequency as a pulse in a preceding group of pulses, and
    determining a plurality of phase shift changes relating to different pairs of pulses having equal frequency.

5. The method according to claim 4, at least one of the pulses in each group of pulses having a frequency which was not included in a preceding group of pulses.

6. The method according to claim 2, said method comprising
    transmitting, in said first operating mode, a pulse train of distinct carrier wave pulses, said pulse train having an average duty cycle of less than 50 percent, each pulse having a duration greater than 1 microsecond and shorter than 100 milliseconds and a defined center frequency, selected according to a frequency scheme within a predetermined frequency range, said predetermined frequency range being greater than 5% of an average center frequency, and determining said distance by:

calculating, based on an initially estimated distance, expected phase properties of each received distinct pulse in relation to each corresponding transmitted distinct pulse, and correlating said actual phase properties with said expected phase properties to provide an updated estimation of said distance.

7. The method according to claim 2, said method comprising, in said first operating mode:

transmitting a train of short pulses, and determining said distance based on the time of flight for each pulse.

8. The method according to claim 2, said method comprising, in said first operating mode:

transmitting a frequency sweep over a range of frequencies, and determining said distance based on a relationship between the transmitted sweep and the reflected sweep.

9. The method according to claim 1, wherein said pulses having equal frequencies are time separated by at least 5 seconds.

10. The method according to claim 1, further comprising determining a plurality of phase shift changes before determining said distance.

11. The method according to claim 1, wherein each carrier wave frequency is controlled in a fed-back control loop providing a frequency accuracy deviation less than $1/1000$.

12. A level gauging system, for determining a distance to a surface of a product in a tank, said system comprising:

a transceiver for transmitting electromagnetic transmit signals and receiving electromagnetic return signals reflected at said surface, said transceiver being arranged to transmit signals comprising at least two time separated carrier wave pulses having equal frequencies, each pulse having a duration greater than 1 microsecond and shorter than 100 milliseconds, processing circuitry configured to:

determine actual phase properties of each pulse in the transmit signals in relation to each corresponding pulse in the return signals, said phase properties including a phase shift, determine a change in phase shift associated with two pulses in the transmit signals having equal frequencies, compare said change with a threshold value, and depending on a result of said comparing step, determine said distance based on a relationship between said transmit signals and said return signals.

13. The system according to claim 12, wherein said transceiver circuitry and said processing circuitry are adapted to operate in a first operating mode and a second operating mode, wherein said distance is determined in said first operating mode, wherein said phase shift change is determined in said second mode, and wherein said processing circuitry is configured to select said first operating mode depending on a result of said comparing step.

14. The system according to claim 12, wherein said transceiver circuitry is adapted to transmit a lower average transmitted power in said second operating mode than in said first operating mode.

15. The system according to claim 13, wherein said transceiver circuitry in said first operating mode is adapted to transmit a pulse train of distinct carrier wave pulses, said pulse train having an average duty cycle of less than 50 percent, each pulse having a duration greater than 1 microsecond and shorter than 100 milliseconds and a defined center frequency, selected according to a frequency scheme within a predetermined frequency range, said predetermined frequency range being greater than 5% of an average center frequency, and wherein said processing circuitry in said first mode is adapted to determine said distance by:

calculating, based on an initially estimated distance, expected phase properties of each received distinct pulse in relation to each corresponding transmitted distinct pulse, and correlating said actual phase properties with said expected phase properties to provide an updated estimation of said distance.

16. The system according to claim 13, wherein said transceiver circuitry in said first operating mode is adapted to transmit a train of short pulses, and wherein said processing circuitry is adapted to determine said distance based on the time of flight for each pulse.

17. The system according to claim 13, wherein said transceiver circuitry in said first operating mode is adapted to transmit a frequency sweep over a range of frequencies, and wherein said processing circuitry is adapted to determine said distance based on a relationship between the transmitted sweep and the reflected sweep.

18. The system according to claim 12, further comprising a fed-back control loop for controlling each carrier wave frequency to provide a frequency accuracy deviation less than $1/1000$.

19. The system according to claim 12, wherein a time separation between pulses having equal frequencies is at least 5 seconds.

* * * * *